(12) United States Patent
Inamura et al.

(10) Patent No.: US 9,667,165 B2
(45) Date of Patent: May 30, 2017

(54) POWER CONVERSION APPARATUS

(71) Applicant: DENSO CORPORATION, Kariya, Aichi-perf. (JP)

(72) Inventors: Hiroshi Inamura, Nagoya (JP); Hideaki Tachibana, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/874,914

(22) Filed: Oct. 5, 2015

(65) Prior Publication Data

US 2016/0099655 A1 Apr. 7, 2016

(30) Foreign Application Priority Data

Oct. 3, 2014 (JP) ................................ 2014-204567

(51) Int. Cl.
*H02M 7/5387* (2007.01)
*H02M 7/00* (2006.01)

(52) U.S. Cl.
CPC .................................. *H02M 7/003* (2013.01)

(58) Field of Classification Search
CPC .... H02M 7/003; H02M 7/42; H02M 7/53846; H02M 7/5387
See application file for complete search history.

(56) References Cited

U.S. PATENT DOCUMENTS 5,699,609 A * 12/1997 Wieloch ................ H01L 25/072
257/717
6,439,347 B2 * 8/2002 Suga ........................ B66B 1/285
187/290

FOREIGN PATENT DOCUMENTS

JP 2013-135000 A 7/2013

* cited by examiner

*Primary Examiner* — Gary L Laxton
(74) *Attorney, Agent, or Firm* — Oliff PLC

(57) ABSTRACT

A power conversion apparatus includes a semiconductor module that includes a main body containing at least one semiconductor element, power terminals projecting from the main body to be connected to a high-voltage DC power supply and high-voltage signal terminals projecting from the main body, and is configured to convert a DC power supplied from the high-voltage DC power supply to an AC power by switching operation of the semiconductor element. The power conversion apparatus further includes a low-voltage component connected to a low-voltage DC power supply and a control circuit board on which a control circuit for controlling the switching operation of the semiconductor element is formed. The control circuit board is connected with low-voltage signal terminals extending from the low-voltage component and the high-voltage signal terminals. The low-voltage and high-voltage signal terminals are solder-connected to the control circuit board.

4 Claims, 16 Drawing Sheets

POWER CONVERSION APPARATUS

This application claims priority to Japanese Patent Application No. 2014-204567 filed on Oct. 3, 2014, the entire contents of which are hereby incorporated by reference.

BACKGROUND OF THE INVENTION

1. Field of the Invention

The present invention relates to a power conversion apparatus including semiconductor modules each containing therein semiconductor elements, and a control circuit board for controlling switching operations of the semiconductor modules.

2. Description of Related Art

As shown in Japanese Patent Application Laid-open No. 2013-135000, there is known a power conversion apparatus including semiconductor modules each of which includes a main body containing therein semiconductor elements, power terminals projecting from the main body and connected with a high-voltage power supply, and high-voltage signal terminals projecting from the main body. The high-voltage signal terminals are connected to a control circuit board. This power conversion apparatus converts DC power supplied from the high-voltage power supply into AC power when the control circuit board causes the semiconductor elements to perform switching operation.

This power conversion apparatus includes low-voltage components connected to a low-voltage DC power supply whose output voltage is lower than that of the high-voltage power supply. The low-voltage components include a control connector for connecting the control circuit board to the low-voltage DC power supply or an external control unit, and a current sensor for measuring the output currents of the semiconductor modules.

The control circuit board is connected to the high-voltage signal terminals of the semiconductor module, and the low-voltage components. The control circuit board and the high-voltage signal terminals are solder-connected with each other. The control circuit board and the low-voltage components are connected to each other through cables.

The above power conversion apparatus has a problem in that the manufacturing cost is high for the below described reason. Since the control circuit board and the high-voltage signal terminals are solder-connected with each other, while the control circuit board and the low-voltage components are connected to each other through cables, a factory for manufacturing the power conversion apparatus has to be provided with both soldering equipment and cable connecting equipment.

In addition, since the power conversion apparatus has to be provided with a cable-drawing space, it is difficult to reduce the size of the power conversion apparatus.

SUMMARY

An exemplary embodiment provides a power conversion apparatus including:

a semiconductor module that includes a main body containing at least one semiconductor element, power terminals projecting from the main body to be connected to a high-voltage DC power supply and high-voltage signal terminals projecting from the main body, and is configured to convert a DC power supplied from the high-voltage DC power supply to an AC power by switching operation of the semiconductor element;

a low-voltage component connected to a low-voltage DC power supply whose output voltage is lower than an output voltage of the high-voltage DC power supply; and a control circuit board on which a control circuit for controlling the switching operation of the semiconductor element is formed, wherein the control circuit board is connected with low-voltage signal terminals extending from the low-voltage component and the high-voltage signal terminals, and the low-voltage signal terminals and the high-voltage signal terminals are solder-connected to the control circuit board.

According to the exemplary embodiment, there is provided a power conversion apparatus which can be manufactured at a low cost and can be made compact in size.

Other advantages and features of the invention will become apparent from the following description including the drawings and claims.

PREFERRED EMBODIMENTS OF THE INVENTION

First Embodiment

Figure 1:
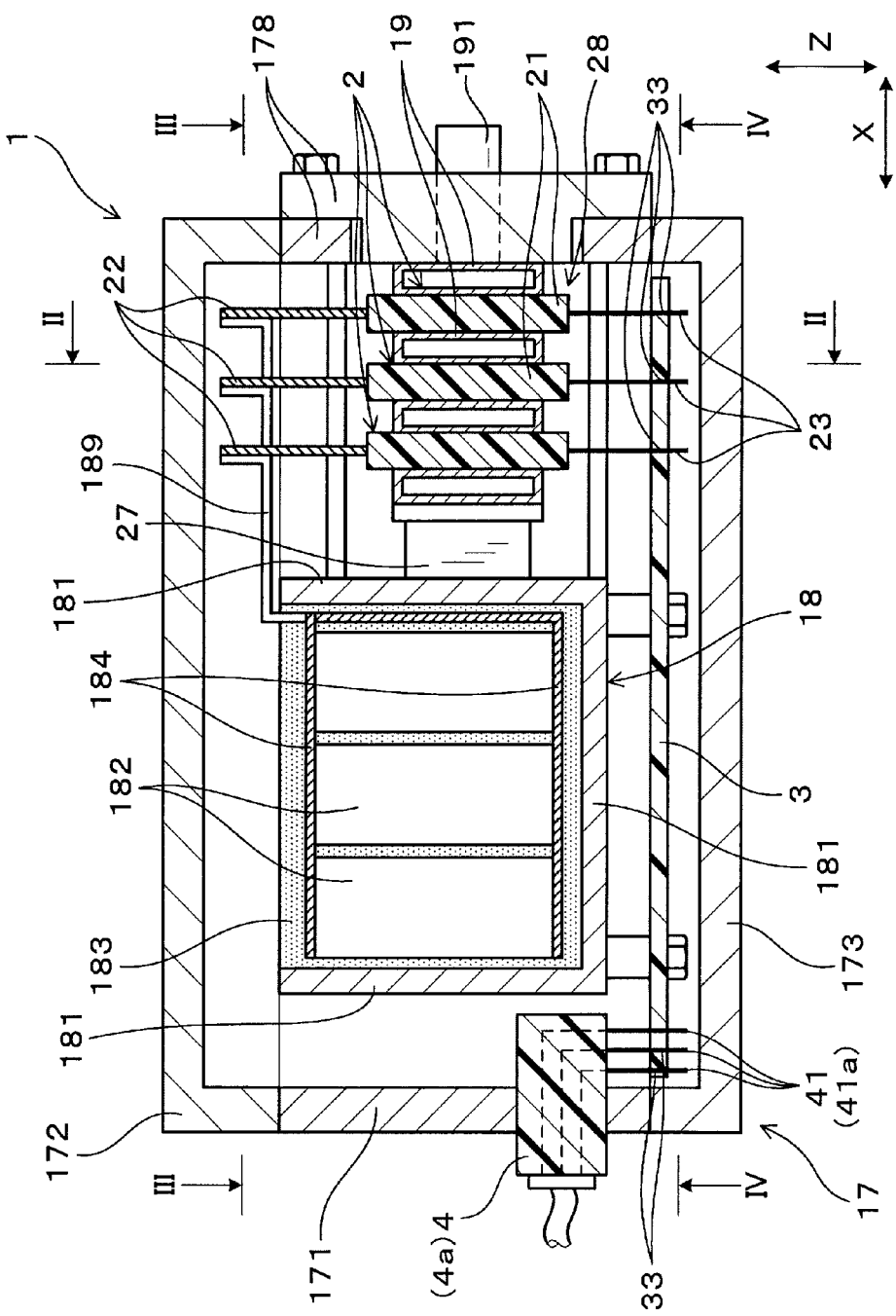
FIG. 1 is a cross-sectional view taken along line I-I of FIG. 2 of a power conversion apparatus according to a first embodiment of the invention.
Figure 2:
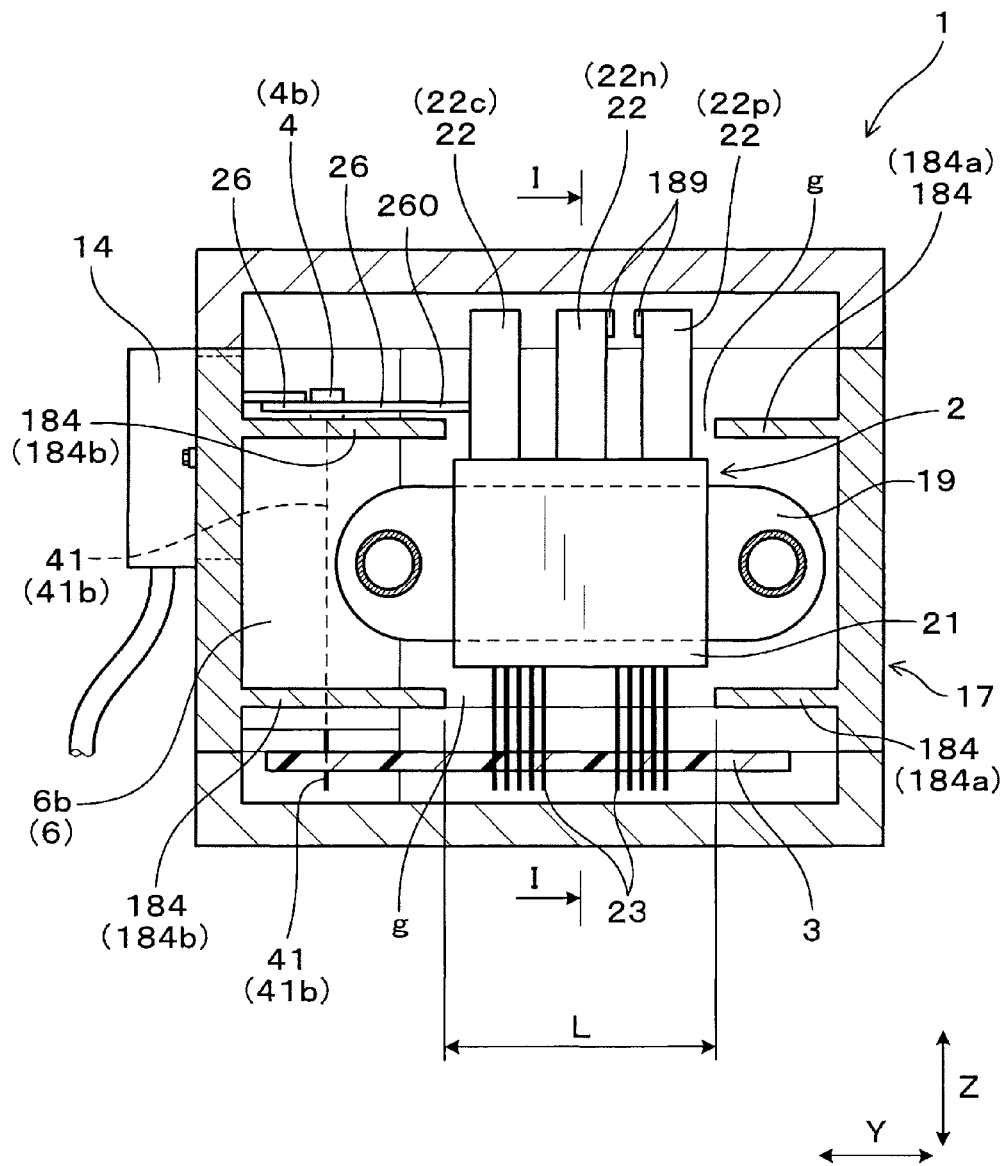
FIG. 2 is a cross-sectional view of FIG. 1 taken along line II-II.

A power conversion apparatus 1 according to a first embodiment of the invention is described with reference to FIGS. 1 to 12. As shown in FIGS. 1 and 2, the power conversion apparatus 1 includes semiconductor modules 2, low-voltage components 4, and a control circuit board 3. Each of the semiconductor modules 2 includes a main body 21 containing therein semiconductor elements 20 (see FIG. 8), power terminals 22 projecting from the main body 21 and connected to a high-voltage DC power supply 10 (see FIG. 8), and high-voltage signal terminals 23 projecting from the main body 21. The semiconductor modules 2 convert a DC power supplied from the high-voltage DC power supply 10 to an AC power by switching operation of their semiconductor elements 20.

The low-voltage components 4 are connected to a low-voltage DC power supply 11 (see FIG. 8) whose output voltage is lower than that of the high-voltage DC power supply 10. A control circuit 30 for controlling the switching operation of the semiconductor elements 20 is formed on the control circuit board 3.

Figure 4:
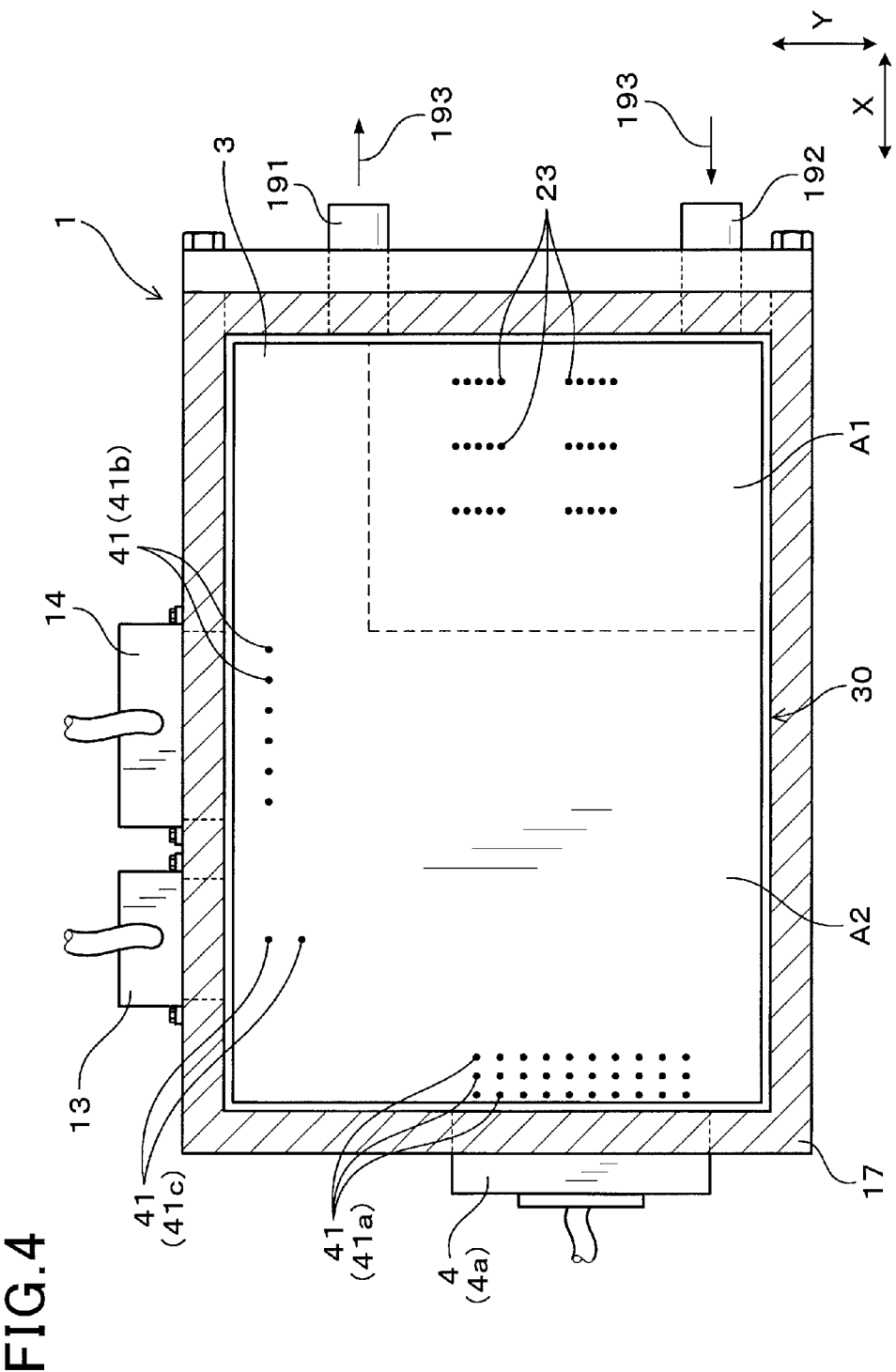
FIG. 4 is a cross-sectional view of FIG. 1 taken along line IV-IV.

As shown in FIG. 4, the control circuit board 3 is connected to low-voltage signal terminals 41 extending from the low-voltage components 4 and to the high-voltage signal terminals 23. The control circuit board 3 includes a high-voltage area A1 connected to the high-voltage signal terminals 23 and a low-voltage area A2 connected to the low-voltage signal terminals 41. The low-voltage signal terminals 41 and the high-voltage signal terminals 23 are solder-connected to the control circuit board 3.

The power conversion apparatus 1 is a vehicle-mounted power conversion apparatus for a vehicle such as an electric vehicle or a hybrid vehicle.

As shown in FIG. 1, the control circuit board 3 is formed with through holes 33. Each of the high-voltage and low-voltage signal terminals 23 and 41 is inserted to a corresponding one of the through holes 33 from one side in the thickness direction (Z-direction) of the control circuit board 3, and solder-connected to the control circuit board 3 at the other side in the Z-direction (see FIG. 12).

Figure 5:
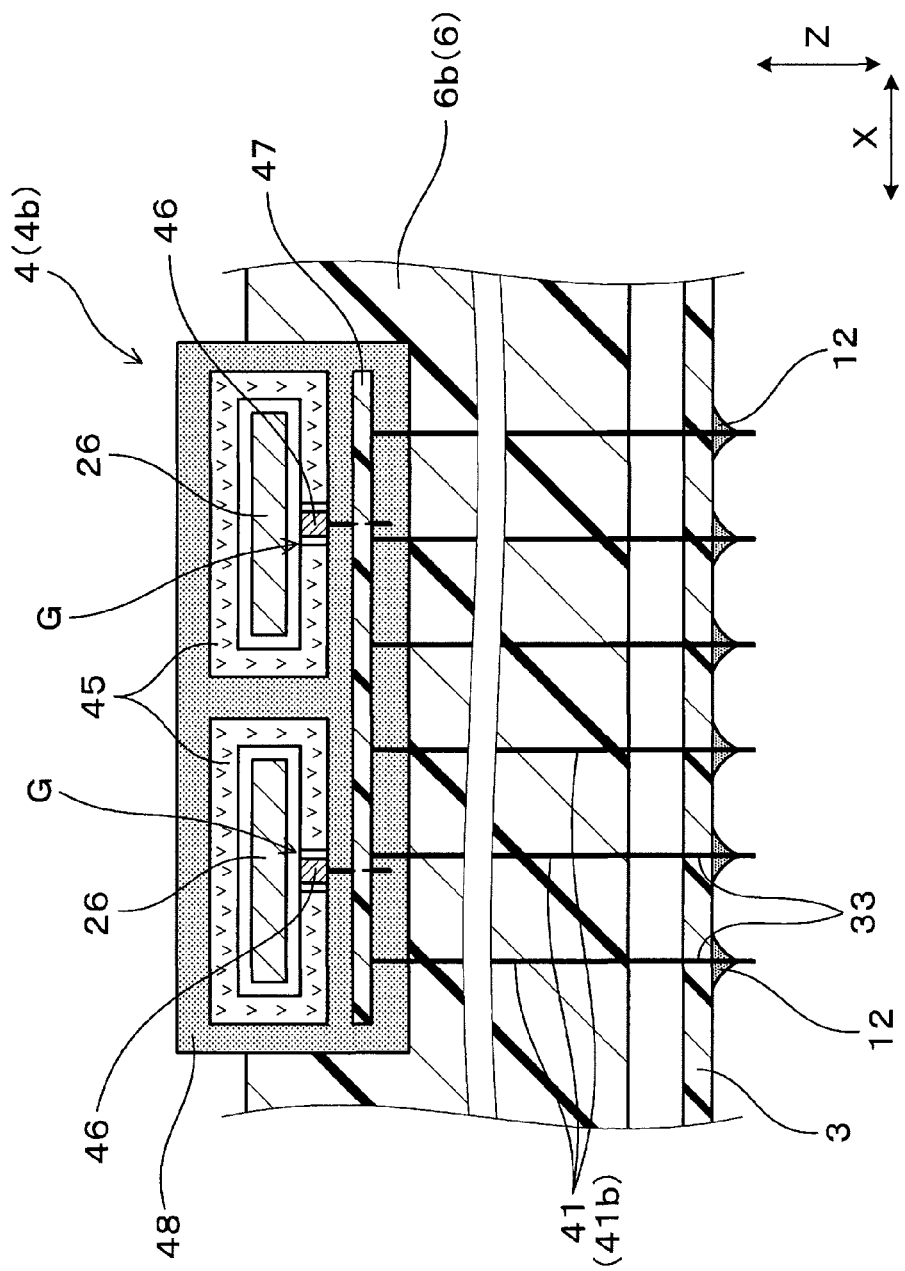
FIG. 5 is a cross-sectional view of FIG. 3 taken along line V-V.
Figure 6:
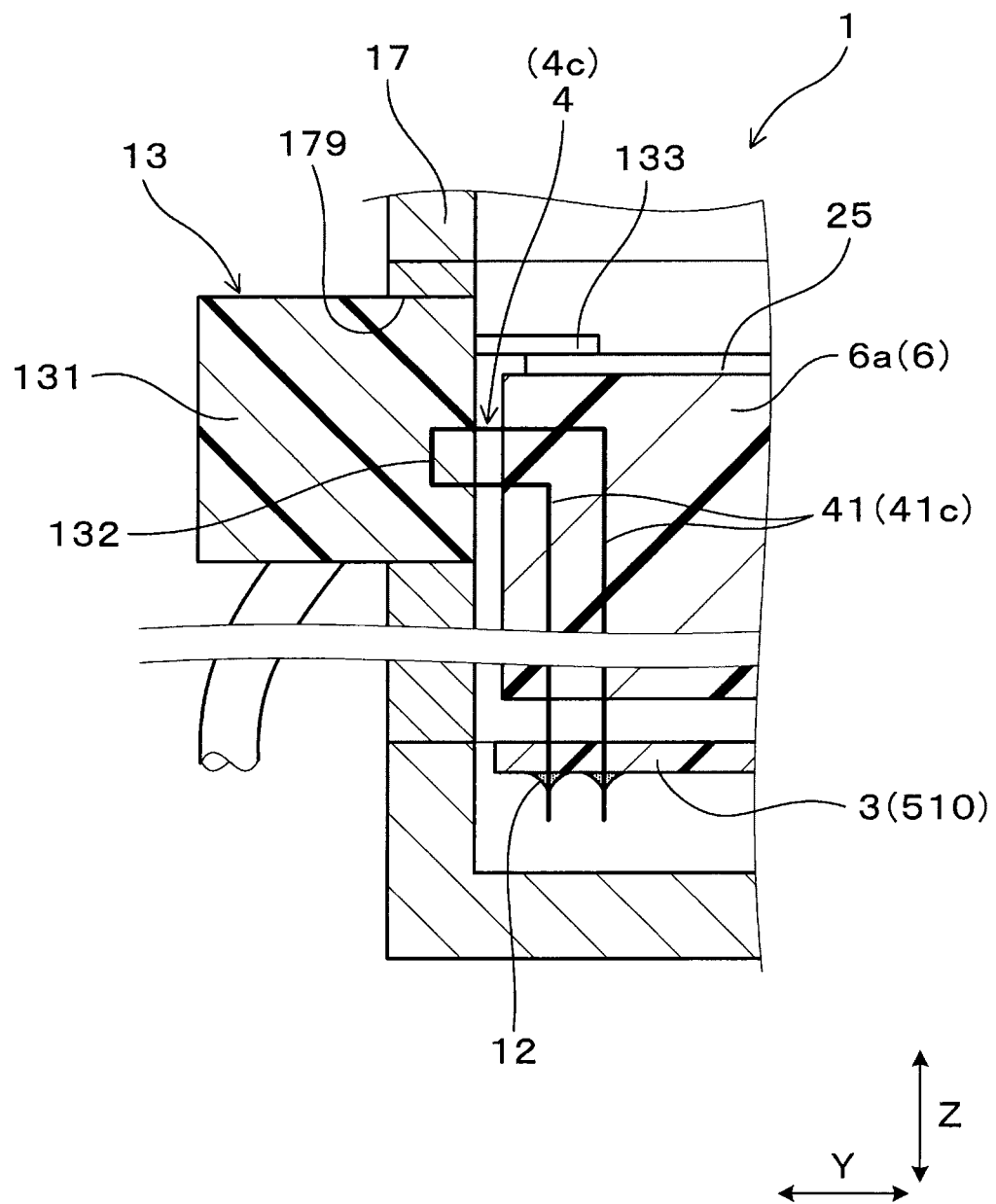
FIG. 6 is an enlarged cross-sectional view of a main part of the power conversion apparatus to which an input connector is fitted.
Figure 8:
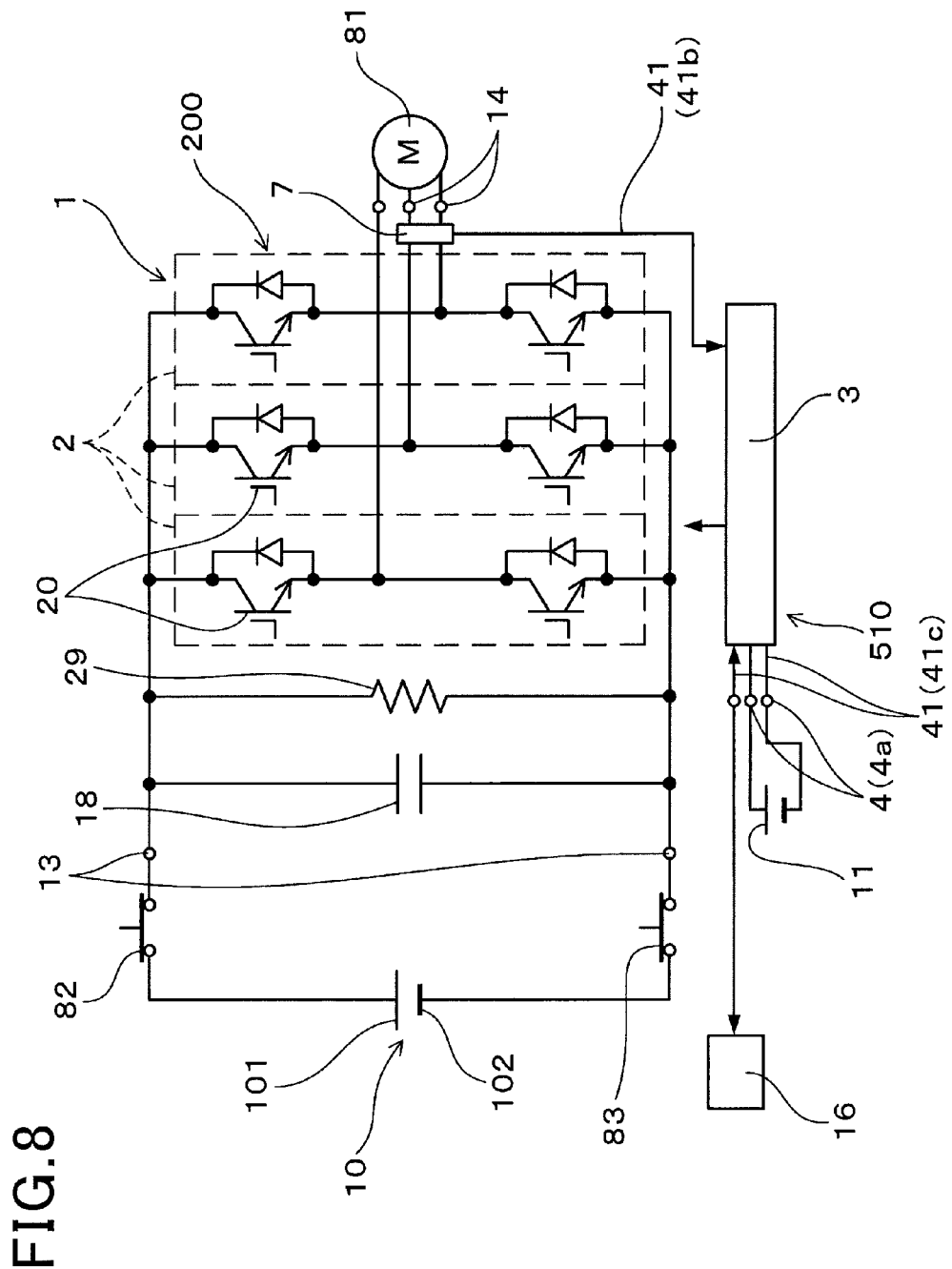
FIG. 8 is a circuit diagram of the power conversion apparatus.

As shown in FIGS. 1, 5 and 6, the power conversion apparatus 1 includes a control connector 4a, a current sensor 4b and an interlock detection part 4c as the low-voltage components 4. As shown in FIG. 8, the control connector 4a connects the low-voltage DC power supply 11 and the control circuit board 3, and connects an external control unit 16 and the control circuit board 3. The external control unit 16 may be an ECU mounted on the vehicle. The control circuit board 3 operates on the power supplied from the low-voltage DC power supply 11.

As shown in FIG. 1, connector terminals 41a projects from the control connector 4a in the Z-direction as the low-voltage signal terminals 41. The connector terminals 41a are connected to the control circuit board 3. The control connector 4a is disposed at a position adjacent to the control circuit board 3 in the Z-direction.

The current sensor 4b is for measuring a current flowing through later-explained output terminals 26. As shown in FIG. 5, sensor terminals 41b as the low-voltage signal terminals extend from the current sensor 4b and connected to the control circuit board 3. The control circuit board 3 uses a current value measured by the current sensor 4b to perform feed-back control on the semiconductor modules 2.

The interlock detection part 4c is for detecting whether or not a later-explained input connector 13 is connected to input terminals 25. As shown in FIG. 6, two interlock terminals 41c as the low-voltage signal terminals extend from the interlock detection part 4c and connected to the control circuit board 3.

As shown in FIG. 8, in this embodiment, an inverter circuit 200 is constituted of the semiconductor modules 2. The DC power supplied from the high-voltage DC power supply 10 is converted to the AC power by causing the semiconductor elements 20 (IGBT elements) included in the semiconductor modules 2 to perform switching operation. The generated AC power is outputted from the power conversion apparatus 1 to drive an AC load (a three-phase motor, for example) to drive the vehicle.

The output voltage of the high-voltage DC power supply 10 is several hundred volts. The output voltage of the low-voltage DC power supply 11, which is a lead acid battery in this embodiment, is approximately 12 volts.

As shown in FIG. 8, the power conversion apparatus 1 includes a capacitor 18 for smoothing the output voltage of the high-voltage DC power supply 10. The capacitor 18 is parallel-connected with a discharge resistor 29. Relays 10 and 11 are provided between the power conversion apparatus 1 and the high-voltage DC power supply 10.

Figure 10:
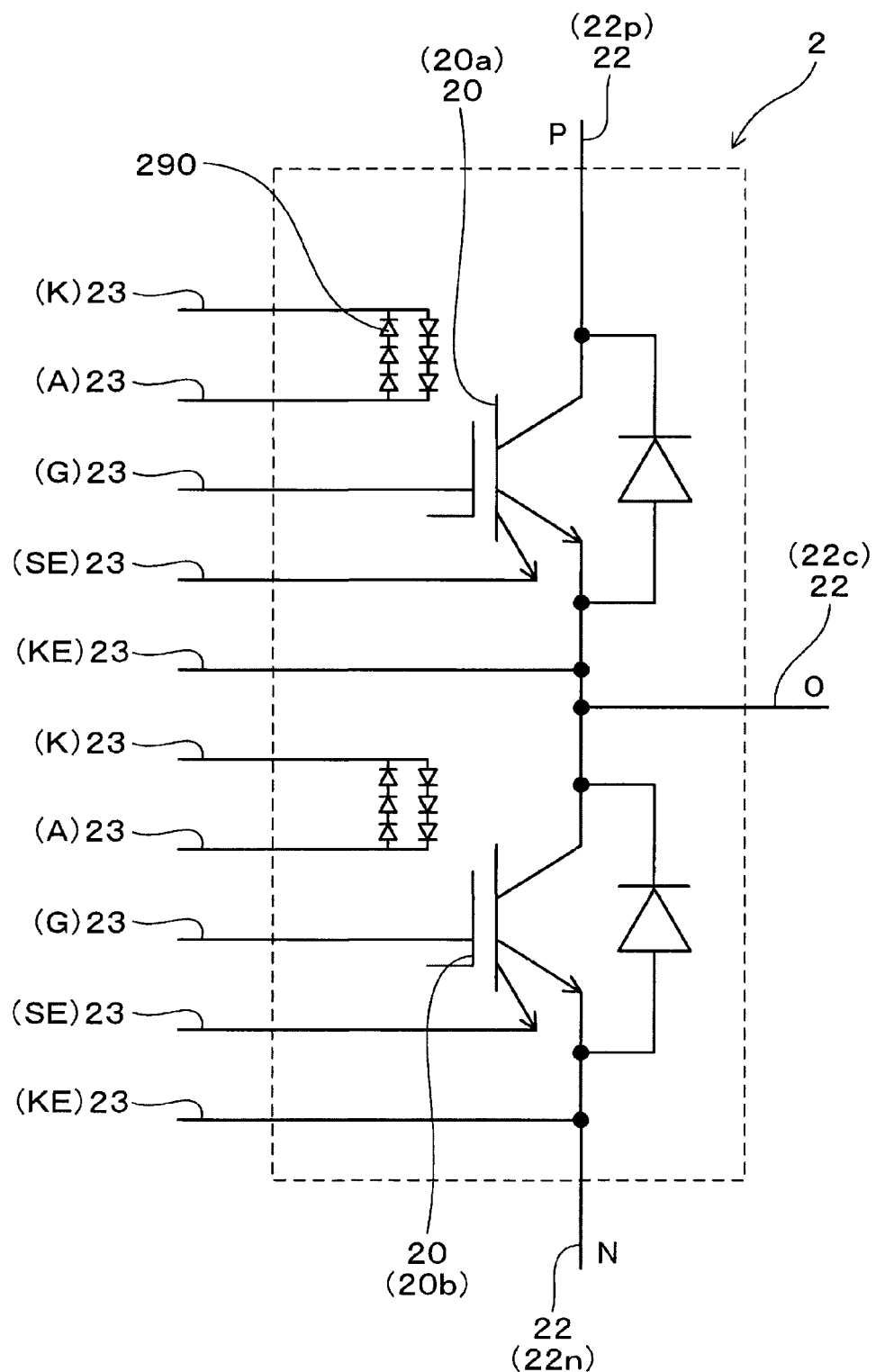
FIG. 10 is a circuit diagram of a semiconductor module included in the power conversion apparatus.

As shown in FIG. 10, each semiconductor module 2 is provided with the high-voltage signal terminals 23. The high-voltage signal terminals 23 include anodes A and cathodes K connected to diodes for sensing the temperature of the semiconductor module 2, gates G of the semiconductor elements 20 (IGBT elements), sense emitters SE for extracting part of the emitter current of each semiconductor element 20, and kelvin emitters KE connected to the emitter of the respective semiconductor elements 20.

Figure 3:
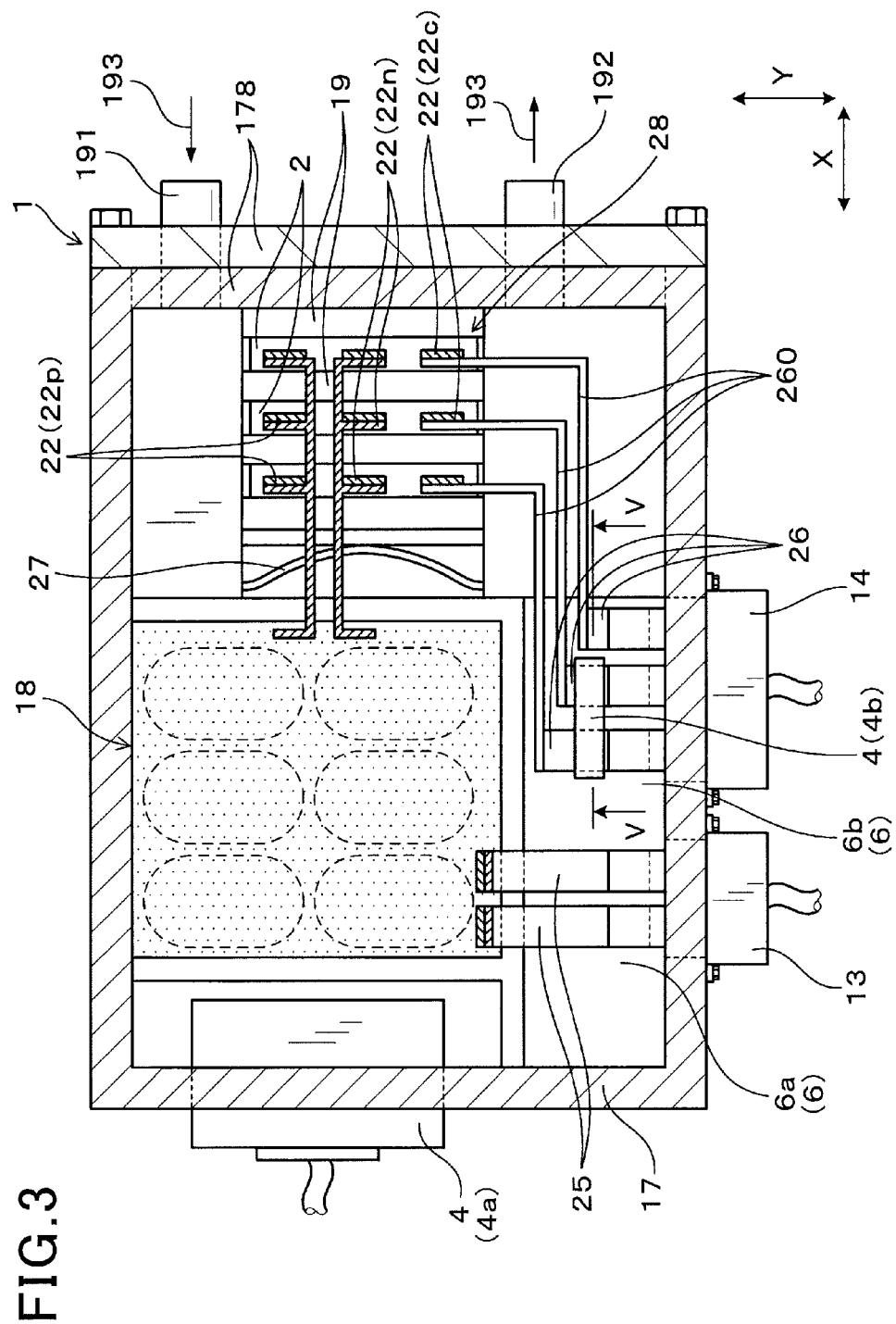
FIG. 3 is a cross-sectional view of FIG. 1 taken along line III-III.

As shown in FIG. 3, the power conversion apparatus 1 includes the output terminals 26 connected to the AC load 81.

The output current of the semiconductor modules 2 flows to the output terminals 26. An output connector 14 is fitted to the output terminals 26. The power conversion apparatus 1 includes a case 17. As shown in FIGS. 3 and 5, the output terminals 26 are mounted on an output terminal block 26b disposed within the case 17.

The current sensor 4b is fitted to the output terminals 26. As shown in FIG. 5, the current sensor 4b includes cores 45 surrounding the output terminals 26, Hall elements 46 disposed in a gap G of each core 45, a sensor circuit board 47 connected to the Hall elements 46, and a sensor sealing part 48 sealing these components. The sensor terminals 41b project from the sensor circuit board 47.

Two of the sensor terminals 41b are used for supplying the power of the low-voltage DC power supply 11 to the sensor circuit board 47. The other sensor terminals 41b are used for transmitting the current values measured by the Hall elements 46 from the sensor circuit board 47 to the control circuit board 3.

The sensor terminals 41b extend in the Z-direction from the sensor circuit board 47. The sensor terminals 41b are partially sealed in the output terminal block 6b. The sensor terminals 41b pass through the output terminal block 6b, project in the Z-direction from the output terminal block 6b, and pass through the through holes 33 to be soldered to the control circuit board 3. As shown in FIGS. 2 and 5, the output terminal block 6b is disposed at a position adjacent to the control circuit board 3 in the Z-direction.

As shown in FIG. 3, the power conversion apparatus 1 includes the input terminals 25 for connection with the high-voltage DC power supply 10. An input terminal block 6a on which the input terminals 25 are mounted is disposed within the case 17. The input terminal block 6a is made of insulating resin, and formed integrally with the output terminal block 6b as a single terminal block 6.

The input terminals 25 are connected to the input connector 13. The input terminals 25 are connected to the high-voltage DC power supply 10 through the input connector 13. The power conversion apparatus 1 is provided with an interlock device 510 which is configured to turn off the relays 82 and 83 (see FIG. 5) when the input connector 13 is removed. Accordingly, a worker can be prevented from receiving an electric shock when the worker touches the inside of the removed input connector 13 or the input terminals 25.

Figure 7:
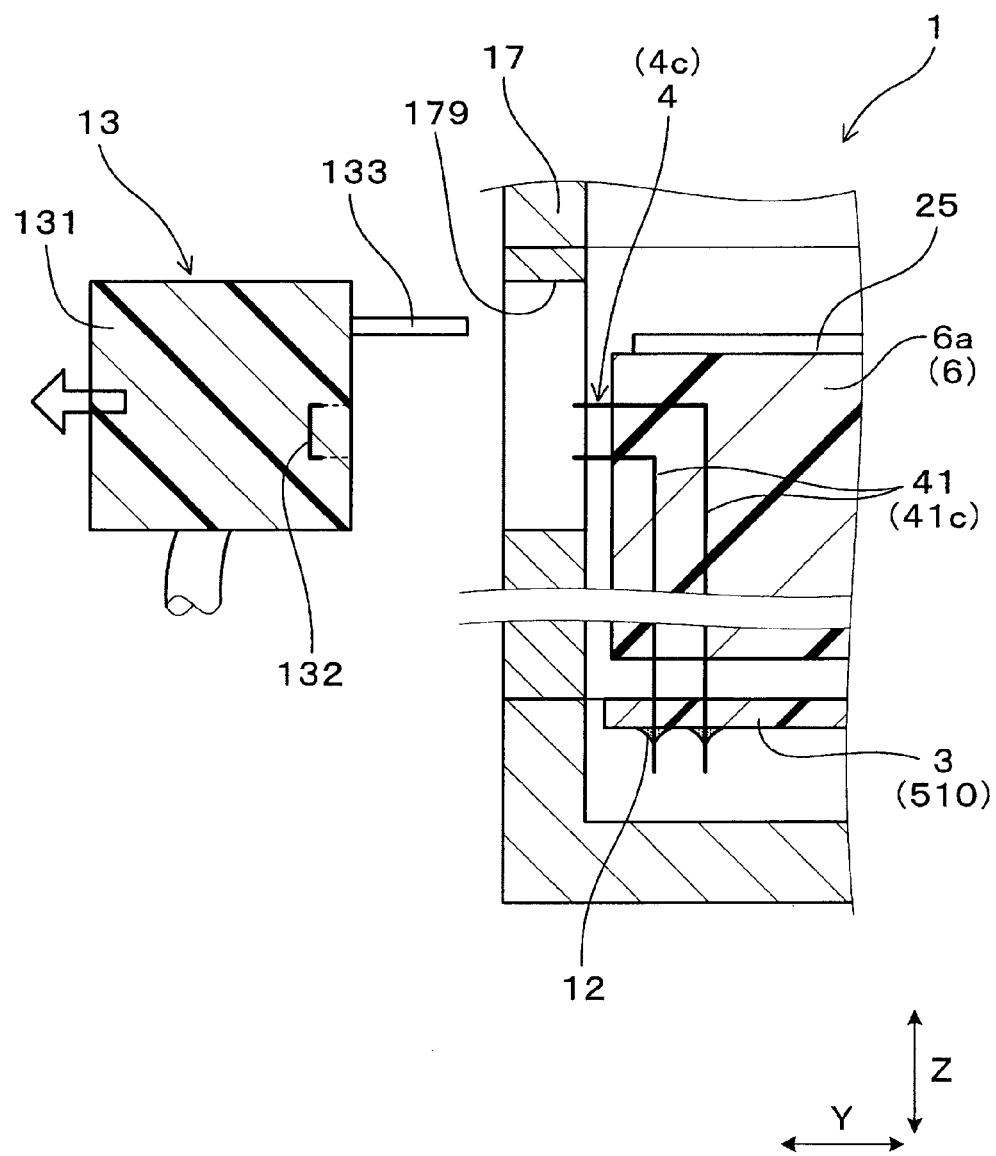
FIG. 7 is an enlarged cross-sectional view of the main part of the power conversion apparatus from which the input connector is removed.

As shown in FIGS. 6 and 7, the input connector 13 includes a connector main body 131, connector terminals 133 projecting from the connector main body 131, and a conductor part 132 embedded in the connector main body 131.

As shown in FIG. 6, the connector main body 131 is inserted into a through 179 formed in the case 17. A spring member (not shown) is disposed within the case 17. This spring member presses the connector terminals 133 in the Z-direction toward the input terminals 25 so that the connector terminals 133 and the input terminals 25 are electrically connected.

As shown in FIGS. 6 and 7, the input terminal block 6a is provided with the interlock detection part 4c to detect whether or not the input connector 13 is connected to the input terminals 25. In this embodiment, the interlock detection part 4c is constituted of two lead wires. The interlock detection part 4c is connected with the interlock terminals 41c.

The interlock terminals 41c are sealed in the input terminal block 6a. The interlock terminals 41c pass through the input terminal block 6a, and project from the input terminal block 6a in the Z-direction. As described in the foregoing, the interlock terminals 41c are connected to the control circuit board 3. The control circuit board 3 measures the resistance between the two interlock terminals 41c.

As shown in FIG. 6, when the input connector 13 is inserted into the through hole 179, the interlock detection part 4c is connected to the conductor part 132 of the input connector 13. As shown in FIG. 7, when the input connector 13 is removed, the conductor part 132 is separated from the interlock detection part 4c. The control circuit board 3 determines that the input connector 3 is connected to the input terminals 25 when the conductor part 132 is connected to the interlock detection part 4c as shown in FIG. 6, causing the resistance between the two interlock terminals 41c to decrease. The control circuit board 3 determines that the input connector 3 is disconnected from the input terminals 25, and turns off the relays 82 and 83 when the conductor part 132 is separated from the interlock detection part 4c as shown in FIG. 7, causing the resistance between the two interlock terminals 41c to increase.

As shown in FIGS. 1 and 3, the semiconductor modules 2 and cooling tubes 19 are stacked on one another as a stacked body 28. A pressing member (a plate spring in this embodiment) 27 is disposed between the stacked body 28 and the capacitor 18. The stacked body 28 is pressed toward a wall part 178 of the case 17 by the pressing member 27. Accordingly, the stacked body 28 can be fixed within the case 17 while ensuring a contact pressure between the semiconductor modules 2 and the cooling tubes 19.

As shown in FIG. 2, each semiconductor module 2 includes the power terminals 22. The power terminals 22 includes DC terminals 22p and 22n applied with the DC voltage of the high-voltage DC power supply 10, and an AC terminal 22c connected to the AC load 81. The DC terminals 22p and 22n are connected to the capacitor 18 through a DC bus bar 189. The AC terminal 22c is connected to an AC bus bar 260. As shown in FIG. 3, an end part of the AC bus bar 260 serves as the output terminal 26.

As shown in FIG. 1, the capacitor 18 includes a capacitor wall part 181, capacitor elements 182, a sealing member 183 for sealing the capacitor element 182, and a pair of reinforcing plates 184 connected to the capacitor elements 182. The reinforcing plates 184 are formed integrally with the DC bus bar 189. The capacitor wall part 181 is formed integrally with the case 17.

Figure 9:
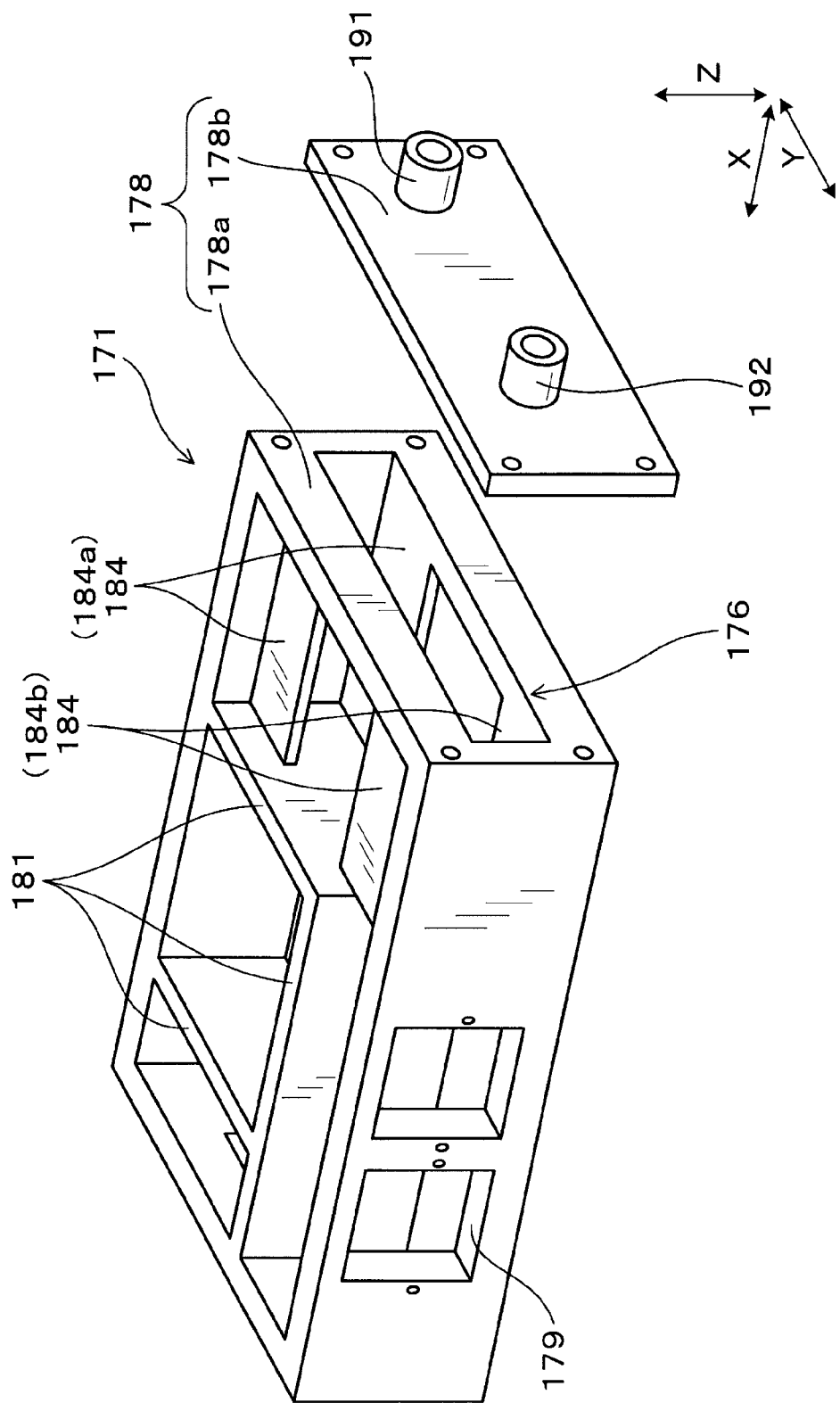
FIG. 9 is a perspective view of a case of the power conversion apparatus.

The case 17 includes a case main body 171, and covers 172 and 173 fitted to the case main body 171. As shown in FIG. 9, the reinforcing plates 184 (184a, 184b) are provided within the case 171. The rigidity of the case 17 is increased by the reinforcing plates 184 to prevent the case 17 from being deformed by the pressing force of the pressing member 27.

An inlet tube 191 and an outlet tube 192 are provided in the wall part 178 of the case 17. The wall part 178 has a two-layer structure including an inner wall part 178a and an outer wall part 178b. The inner wall part 178a is provided with a through hole 176 penetrating through the inner wall part 178a in the projecting direction (X-direction) of the inlet and outlet tubes 191 and 192.

As shown in FIG. 2, the distance L between the two reinforcing plates 184a and 184b in the longitudinal direction (Y-direction) of the cooling tube 19 is smaller than the length of the cooling tube 19 in the Y-direction. Accordingly, it is not possible to put the cooling tube 19 into the case 17 from the gap g between the reinforcing plates 184a and 184b at the time of assembling the power conversion apparatus 1. Accordingly, in this embodiment, the cooling tube 19 is put into the case 17 from the through hole 176 (see FIG. 9), and then the through hole 176 is closed by the outer wall part 178b.

Figure 11:
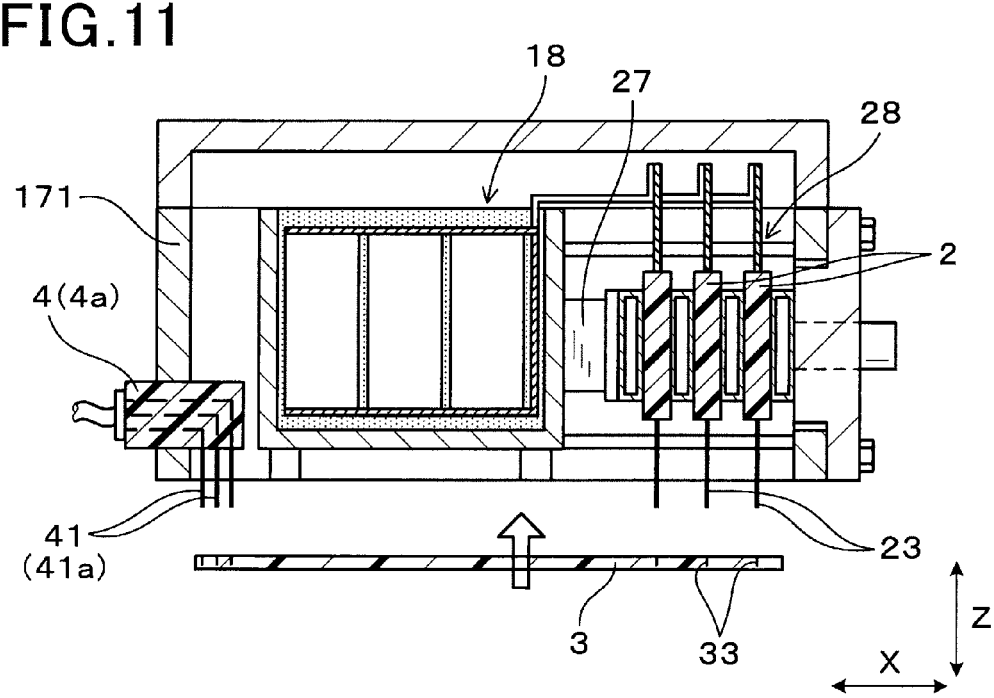
FIGS. 11 and 12 are diagrams for explaining a manufacturing process of the power conversion apparatus.

Next, a process of manufacturing the power conversion apparatus 1 is explained. At first, as shown in FIG. 11, the stacked body 28 is housed in the case main body 171, and then fixed within the case 17 using the pressing member 27. Further, the control connector 4a is fitted to the case 17. Next, the terminal block 6 including the sensor terminals 41b (see FIG. 5) and the interlock terminals 41c (see FIG. 6) is housed in the case 17. Next, the connector terminals 41a projecting from the control connector 4a, the sensor terminals 41b and the interlock terminals 41c both projecting from the terminal block 6, and the high-voltage signal terminals 23 of the semiconductor modules 23 are put into the through holes 33 formed in the control circuit board 3.

Thereafter, the principal surface 390 of the control circuit board 3 is brought into contact with a melted solder 12 so that the high-voltage signal terminals 23 and the low-voltage signal terminals 41 are connected to the control circuit board 3.

Next, advantages of the above described first embodiment are explained. As shown in FIG. 3, the low-voltage signal terminals 41 (41 to 41c) extending from the low-voltage components 4 (4a to 4c) and the high-voltage signal terminals 23 projecting from the semiconductor modules 2 are solder-connected to the control circuit board 3. Accordingly, since the semiconductor modules 2 and the low-voltage components 4 can be connected to the control circuit board 3 only by performing a soldering process, no cable is needed for connecting the semiconductor modules 2 and the low-voltage components 4 to the control circuit board 3. Therefore, it is enough for a factory for manufacturing the power conversion apparatus 1 to have equipment for performing the soldering process, and the factory is not required to have equipment for performing a cable connection process. Hence, the manufacturing cost of the power conversion apparatus 1 can be reduced.

Figure 17:
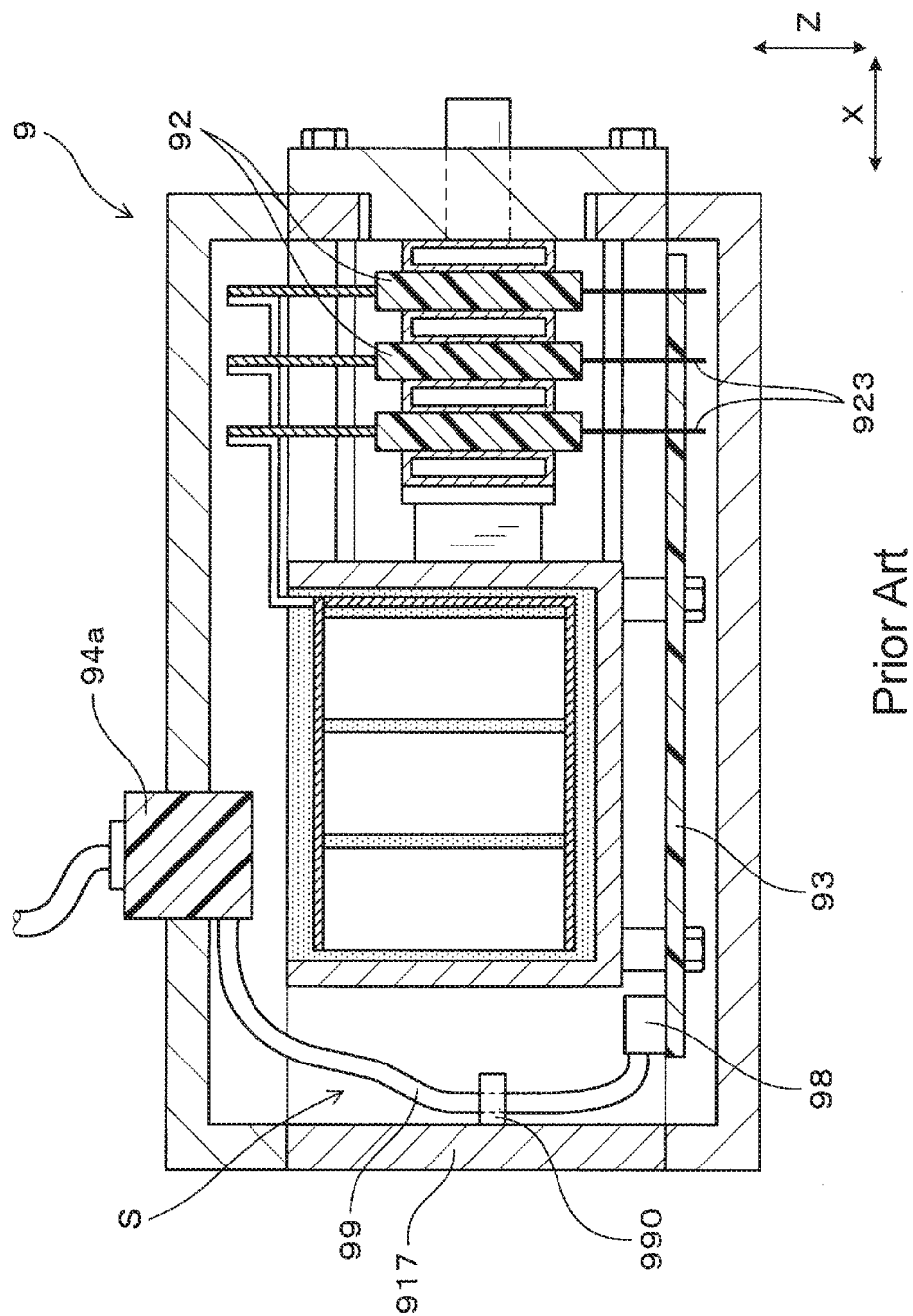
FIG. 17 is a cross-sectional view of a power conversion apparatus of a comparative example.

Conventionally, as shown in FIG. 17, to manufacture a power conversion apparatus 9, high-voltage signal terminals 94 are solder-connected to the control circuit board 3, while a control connector 915 is connected to the control circuit board 3 through a cable 99. Accordingly, the conventional process of manufacturing the power conversion apparatus 9 includes a soldering process and a cable connection process. Therefore, a factory for manufacturing the power conversion apparatus 9 has to be provided with both the equipment for performing the soldering process and the equipment for performing the cable connection process. Hence, the manufacturing cost of the conventional power conversion apparatus 9 is high. In addition, since a space S for drawing the cable 99 and a cramp 990 for fixing the cable 99 has to be provided in a case 917, it is difficult to reduce the size of the power conversion apparatus 9.

In contrast, according to this embodiment, since all the signal terminals 23 and 41 are solder-connected, such equipment for performing soldering is not necessary. Accordingly, the manufacturing cost of the power conversion apparatus 1 can be reduced. In addition, since it is not necessary to provide a space for drawing cables and cramps for fixing cables in the space 17, the power conversion apparatus 1 can be made compact in size.

Figure 12:
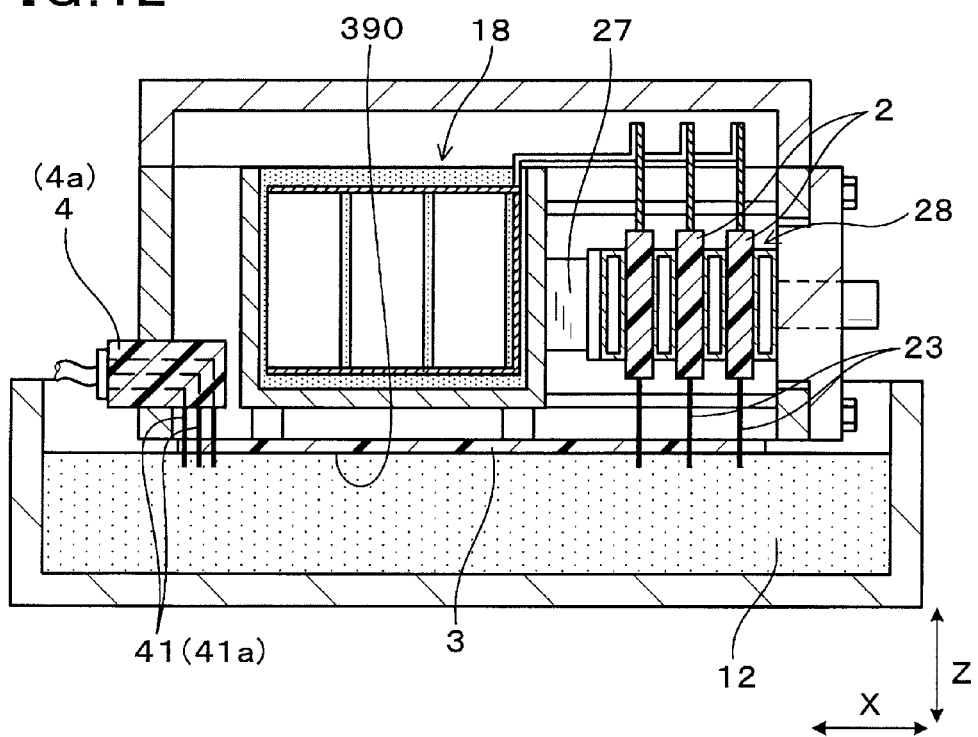

As shown in FIGS. 11 and 12, the control circuit board 3 is formed with the through holes 33. The high-voltage signal terminals 23 and the low-voltage signal terminals 41 are inserted into the through holes 33 from one side in the Z-direction, and all of them are solder-connected to the control circuit board 3 at the other side. Accordingly, all the signal terminals can be solder-connected to the control circuit board 3 by performing a soldering process only once.

As shown in FIG. 1, the power conversion apparatus 1 includes the connector terminals 41a as the low-voltage signal terminals projecting in the Z-direction from the control connector 4a. The control connector 4a is disposed at a position adjacent to the control circuit board 3 in the Z-direction. Accordingly, the control connector 4a can be located in the vicinity of the control circuit board 3, so that the connector terminals 41a projecting from the control connector 4a can be put into the through holes 33 easily. Hence, the step of connecting the connector terminals 41a to the control circuit board 3 can be performed easily.

As shown in FIG. 5, the power conversion apparatus 1 includes, as the low-voltage signal terminals, the sensor terminals 41 which are connected to the current sensor 4b, pass through the output terminal block 6b, and project from the output terminal block 6b in the Z-direction. The output terminal block 6b is disposed at a position adjacent to the control circuit board 3 in the Z-direction. Accordingly, since the output terminal block 6b can be located in the vicinity of the control circuit board 3, the sensor terminals 41 projecting from the output terminal block 6b can be put into the through holes 31 of the control circuit board 3 easily.

As shown in FIG. 6, the power conversion apparatus 1 includes, as the low-voltage signal terminals, the interlock terminals 41c which are connected to the interlock detection part 4c, pass through the input terminal block 6a, and project from the input terminal block 6a in the Z-direction. The input terminal block 6a is disposed at a position adjacent to the control circuit board 3 in the Z-direction. Accordingly, since the input terminal block 6a can be located in the vicinity of the control circuit board 3, the interlock terminals 41c projecting from the input terminal block 6a can be put into the through holes 31 of the control circuit board 3 easily.

Hence, according to this embodiment it is possible to provide a power conversion apparatus whose manufacturing cost is low and which is compact in size.

Second Embodiment

Figure 13:
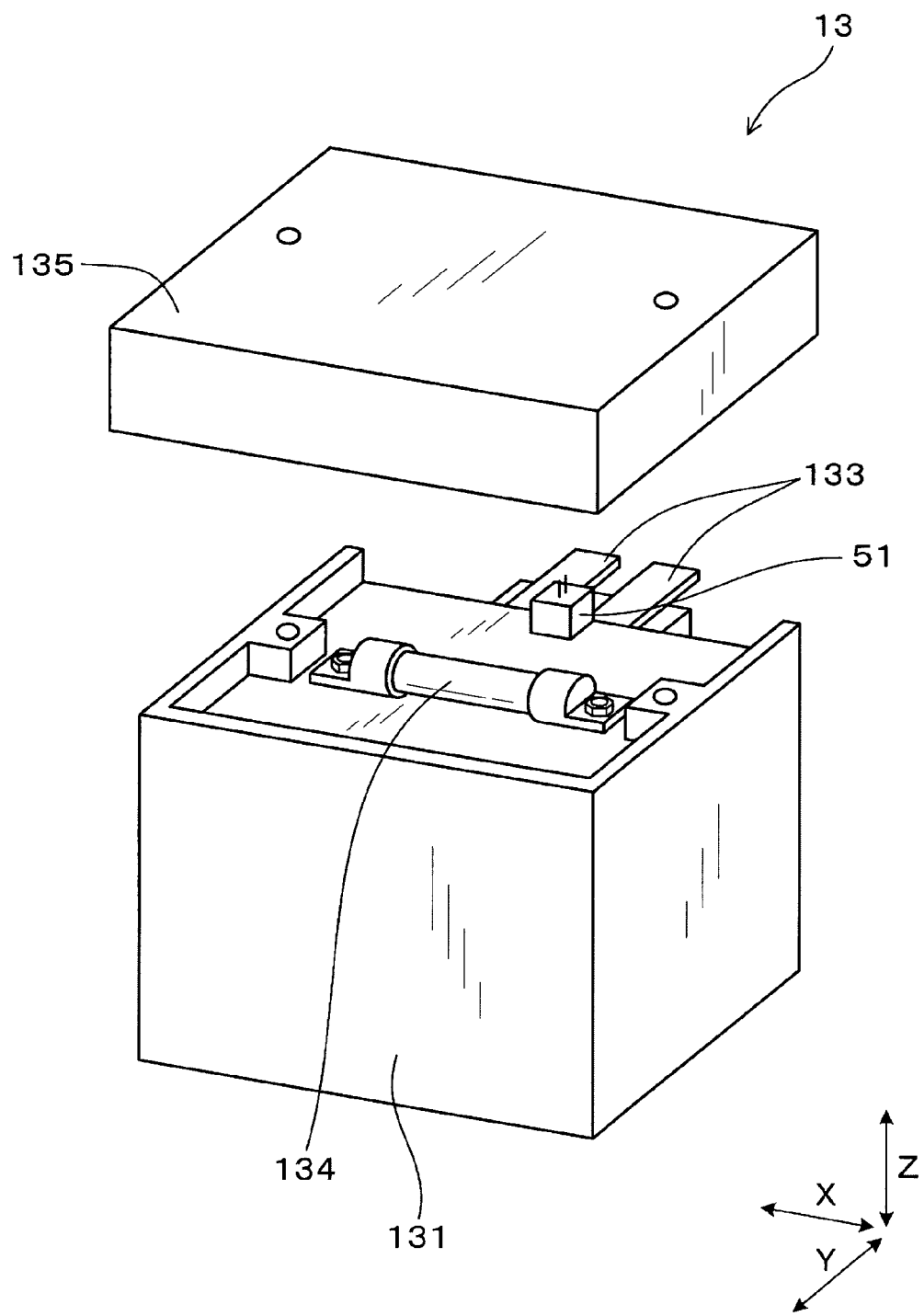
FIG. 13 is an exploded perspective view of an input connector of a power conversion apparatus according to a second embodiment of the invention.
Figure 16:
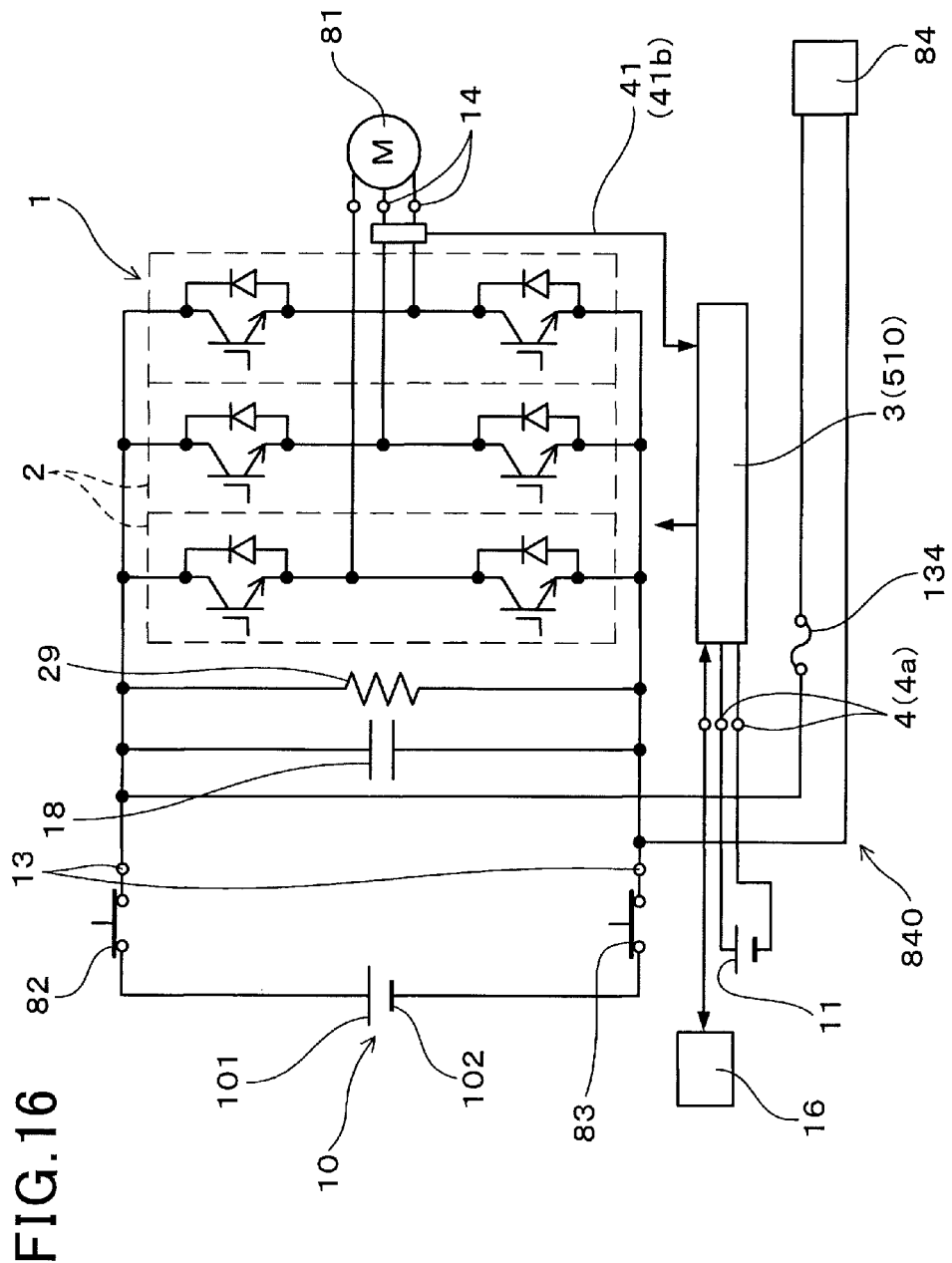
FIG. 16 is a circuit diagram of the power conversion apparatus according to the second embodiment.

FIG. 13 is an exploded perspective view of an input connector 13 of a power conversion apparatus 1 according to a second embodiment of the invention. As shown in FIG. 13, the power conversion apparatus 1 according to the second embodiment, the input connector 13 includes a fuse 134 housed in the connector main body 131, and a fuse cover 135 fitted to the connector main body 131. As shown in FIG. 16, this embodiment includes a current branching path 840 for supplying part of the DC power supplied from the high-voltage DC power supply 10 to an external unit 84. The fuse 134 is mounted on the current branching path 840.

In this embodiment, the external unit 84 is a vehicle air-conditioning unit. If an excessively large current flows through the external unit 84, the fuse 134 is blown to protect the external unit 84.

Figure 15:
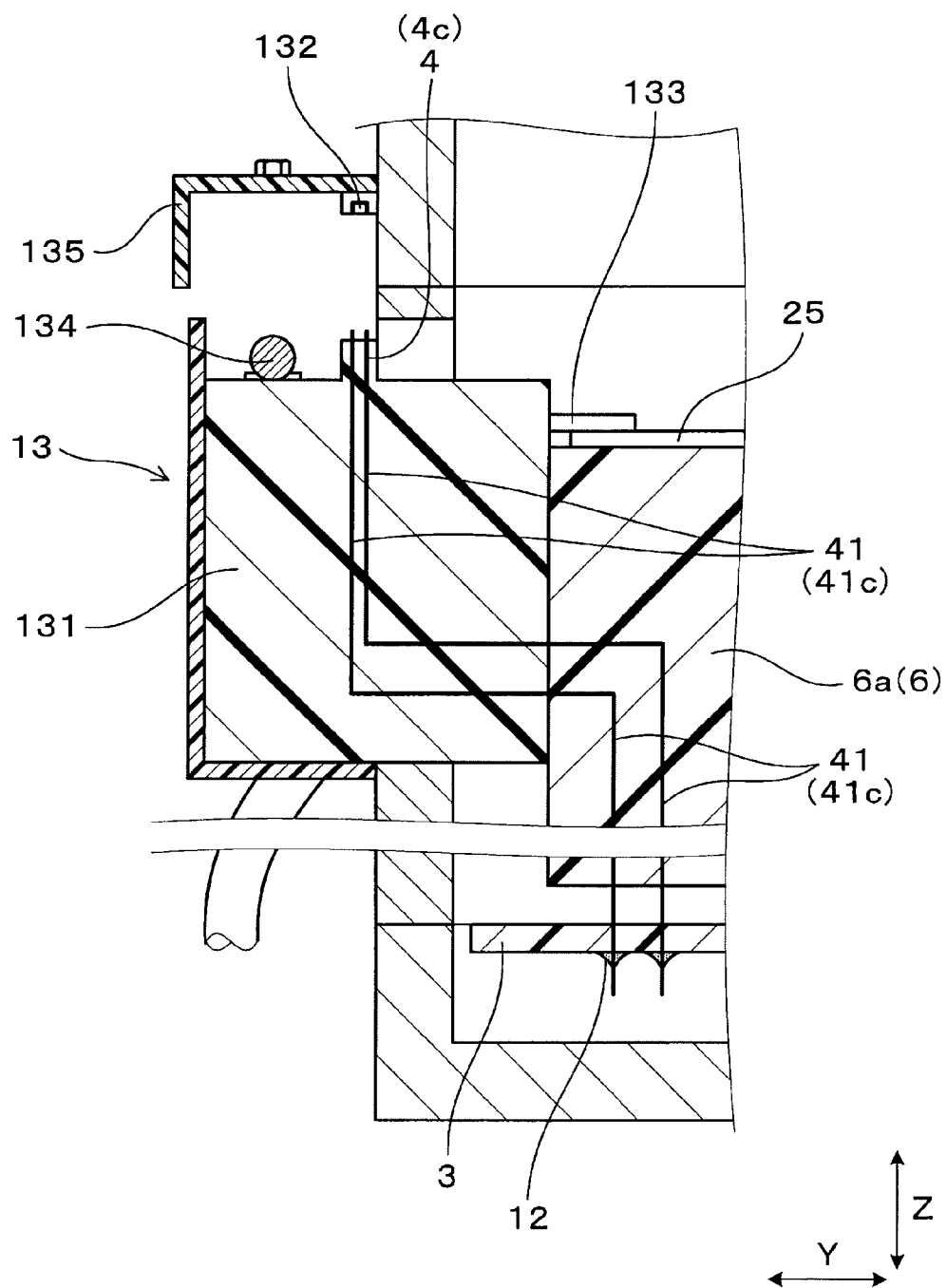
FIG. 15 is an enlarged cross-sectional view of the main part of the power conversion apparatus according to the second embodiment from which the fuse cover is removed.

If the fuse 134 is blown, it can be exchanged with a new one by removing the fuse cover 135 (see FIG. 15). This embodiment includes the interlock device 510 which turns off the relays 82 and 83 when the fuse cover 135 is removed, to thereby prevent a worker from receiving an electric shock when the worker touches the inside of the input connector 13.

Figure 14:
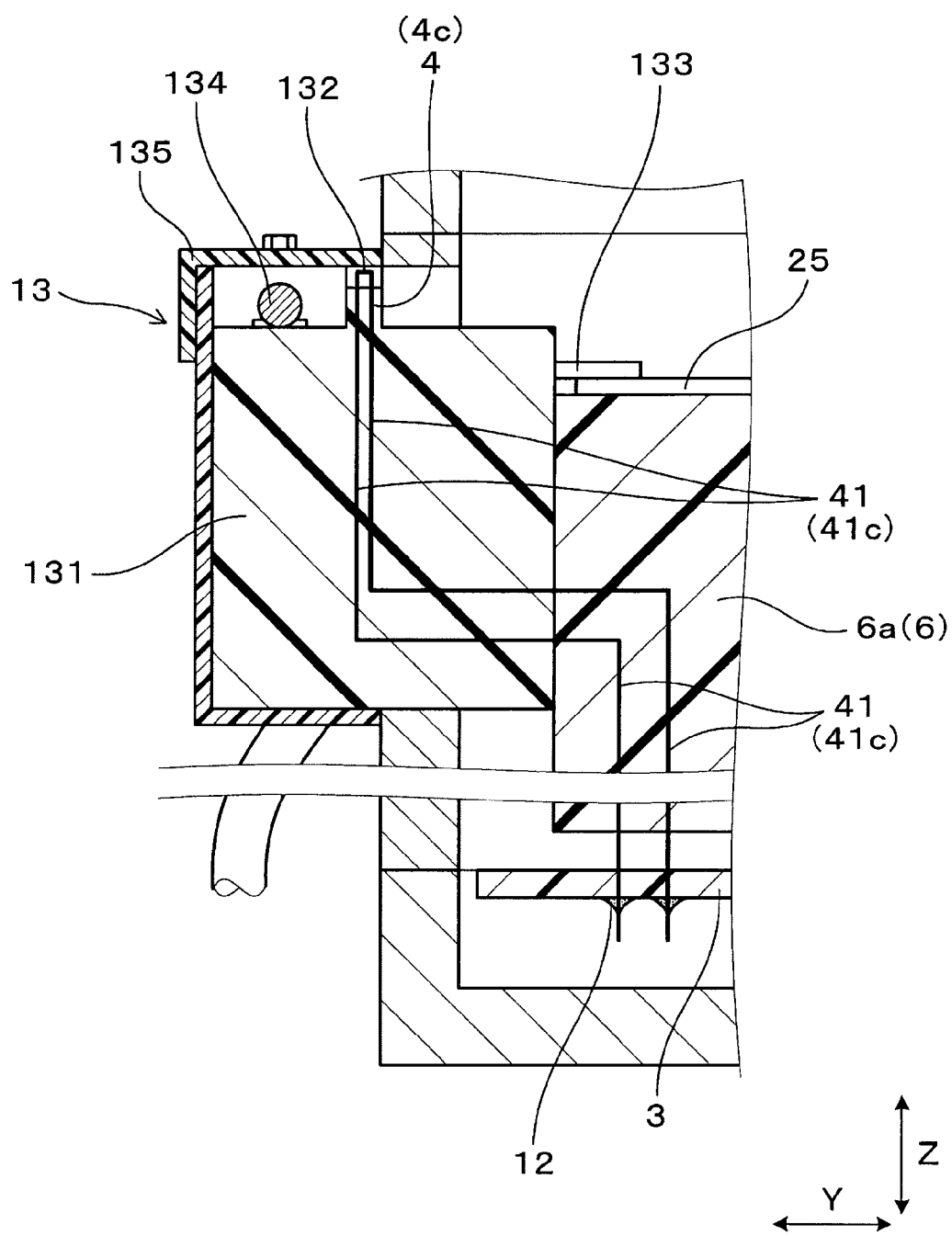
FIG. 14 is an enlarged cross-sectional view of a main part of the power conversion apparatus according to the second embodiment to which a fuse cover is fitted.

As shown in FIG. 14, the interlock detection part 4c is provided in the input connector 13. The interlock terminals 41c are connected to the interlock detection part 4c. The interlock terminals 41c pass through the connector main body 131 and the input terminal block 6a, and are connected to the control circuit board 3. The control circuit board 3 measures the resistance between the two interlock terminals 41c.

The interlock detection part 4c is connected to the conductor part 132 provided in the fuse cover 135 in the state where the fuse cover is 135 is fitted. In this state, the resistance between the two interlock terminals 41c measured by the control circuit board 3 is small. Accordingly, the control circuit board 3 can determine that the fuse cover 135 is fitted based on the measured resistance.

As shown in FIG. 15, when the fuse cover 135 is removed, the conductor part 132 is separated from the interlock detection part 4c. As a result, the resistance between the two interlock terminals 41c measured by the control circuit board 3 increases.

In this state, the control circuit board 3 determines that the fuse cover 135 has been removed, and turns off the relays 82 and 83. Other than the above, the second embodiment is the same in structure as the first embodiment.

The above explained preferred embodiments are exemplary of the invention of the present application which is described solely by the claims appended below. It should be understood that modifications of the preferred embodiments may be made as would occur to one of skill in the art.

What is claimed is:
1. A power conversion apparatus comprising;
a semiconductor module configured to convert a DC power supplied from a high-voltage DC power supply to an AC power by switching operation of the semiconductor element, the semiconductor module including:
a main body containing a semiconductor element:

power terminals projecting from the main body configured to be connected to the high-voltage DC power supply: and high-voltage signal terminals projecting from the main body:

a low-voltage component connected to a low-voltage DC power supply whose output voltage is lower than an output voltage of the high-voltage DC power supply, the low-voltage component having low-voltage signal terminals extending therefrom; and a control circuit board on which a control circuit for controlling the switching operation of the semiconductor Element is formed, the control circuit board being solder-connected with the low-voltage signal terminals and the high-voltage signal terminals, the control circuit board being formed with through holes respectively corresponding to the high-voltage signal terminals and the low-voltage signal terminals, wherein the high-voltage signal terminals and the low-voltage signal terminals are put into the through holes from one side in a thickness direction of the control circuit board, and the high-voltage signal terminals and the low-voltage signal terminals are solder-connected to the control circuit board at another side in the thickness direction.

2. The power conversion apparatus according to claim 1, wherein the low-voltage component is a control connector for connection between the low-voltage DC power supply and the control circuit board and connection between an external unit and the control circuit board, the low-voltage signal terminals are connector terminals projecting from the control connector in the thickness direction, and the control connector is disposed at a position adjacent to the control circuit board in the thickness direction.

3. The power conversion apparatus according to claim 1, further comprising:

output terminals configured to be connected to an AC load; and an output terminal block on which the output terminals are mounted, wherein the low-voltage component is a current sensor provided in the output terminal block to measure a current flowing through the output terminals, the low-voltage signal terminals are sensor terminals which are connected to the current sensor, pass through the output terminal block, and project from the output terminal block in the thickness direction, and the output terminal block is disposed at a position adjacent to the control circuit board in the thickness direction.

4. The power conversion apparatus according to claim 1, further comprising:

input terminals configured to be connected to the high-voltage DC power supply;

an input terminal block on which the input terminals are mounted; and an input connector for connection between the input terminals and the high-voltage DC power supply, wherein the low-voltage component is an interlock detection part which detects whether or not the input connector is connected to the input terminals, the low-voltage signal terminals are interlock terminals which are connected to the interlock connection part, pass through the input terminal block, and project from the input terminal block in the thickness direction, and the input terminal block is disposed at a position adjacent to the control circuit board in the thickness direction.

* * * * *